T. T. FURLONG.
Bridle-Bit.
No. 225,751.              Patented Mar. 23, 1880.
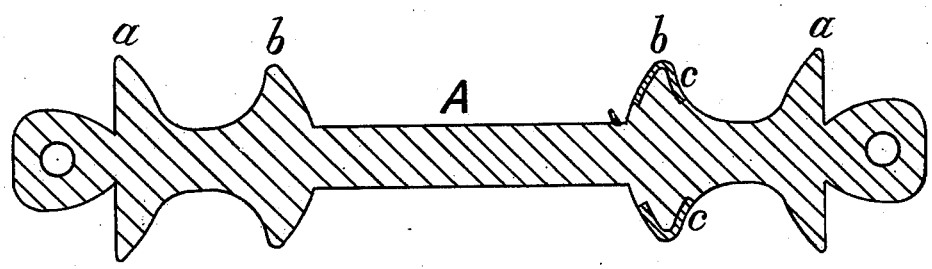

UNITED STATES PATENT OFFICE.

THOMAS T. FURLONG, OF CHICAGO, ILLINOIS.

BRIDLE-BIT.

SPECIFICATION forming part of Letters Patent No. 225,751, dated March 23, 1880.

Application filed September 25, 1879.

*To all whom it may concern:*

Be it known that I, THOMAS T. FURLONG, of Chicago, in the county of Cook and State of Illinois, have invented a new and useful Improvement in Bridle-Bits; and I hereby declare the following to be a full, clear, and exact description thereof, which will enable others skilled in the art to which my invention appertains to make and use the same, reference being had to the accompanying drawing, which forms a part hereof, and in which the figure represents a longitudinal central section of a bridle-bit embodying my invention. Like letters of reference indicate like parts.
My invention relates to improvements in bridle-bits, either bar or snaffle bits; and it consists in so constructing the bit as to prevent it from pressing the lips against the teeth of the horse; and also in providing the bit with a cushion, as hereinafter more particularly described and claimed.

In the drawing, A represents a bar bridle-bit, which may be made of any suitable metal, preferably of malleable iron. A short distance from either end of the bit, and constituting a part thereof, are provided circular flanges or guards $a$ and $b$, as shown. The circumference of the flanges $a$ is slightly greater than that of $b$, and the space between said flanges $a$ and $b$ is sufficiently large to admit of the lips of the horse resting therein, and thereby prevent the lips from coming in contact with the side of the teeth of the horse. The said flanges prevent a lateral movement of the bit when in use in the mouth of the horse; prevent the horse from catching the bit in his teeth; prevent "tongue lolling," and have a tendency to prevent the horse from "side pulling" or dashing to one side.

For the purpose of relieving the pressure of the flanges $b$ against the teeth and gums of the horse, I provide said flanges $b$ with an annular cushion of rubber, $c$, or other elastic material impervious to water.

It is evident that the said flanges and cushions may readily be applied to the ordinary snaffle-bit.

Having thus described my invention, what I claim as new, and desire to secure by Letters Patent, is—

1. A bridle-bit provided with the flanges or guards $a$ and $b$, substantially as shown and described.

2. In combination with a bridle-bit provided with the flanges $a$ and $b$, the elastic cushion $c$, substantially as shown and described.

THOMAS T. FURLONG.

Witnesses:
N. COWLES,
WM. ZIMMERMAN.